United States Patent [19]

Bien

[11] Patent Number: 4,657,460

[45] Date of Patent: Apr. 14, 1987

[54] SELF-BONDING THREADED FASTENERS AND METHOD OF CURING SAME

[75] Inventor: Alfred A. Bien, W. Bloomfield, Mich.

[73] Assignee: Chrysler Motors Corporation, Highland Park, Mich.

[21] Appl. No.: 840,303

[22] Filed: Mar. 17, 1986

[51] Int. Cl.$^4$ .............................................. F16B 39/00
[52] U.S. Cl. .................................. 411/258; 411/369; 411/542; 411/914; 411/915
[58] Field of Search ................. 411/82, 132, 187, 246, 411/257, 258, 301, 302, 313, 369, 371, 372, 542, 914, 915

[56] References Cited

U.S. PATENT DOCUMENTS

| Re. 27,085 | 3/1971 | Weidner | 411/371 |
|---|---|---|---|
| 2,048,234 | 7/1936 | Tucker | 411/915 X |
| 2,398,838 | 4/1946 | Miller et al. | 411/82 X |
| 2,611,285 | 9/1952 | Gross | 411/915 X |
| 2,666,354 | 1/1954 | Dim et al. | 411/369 X |
| 2,983,534 | 9/1961 | Heller et al. | 411/542 |
| 3,202,033 | 8/1965 | Weidner | 411/369 X |
| 3,247,752 | 4/1966 | Greenleaf et al. | 411/542 |
| 3,399,589 | 9/1968 | Breed | 411/542 X |
| 3,469,490 | 9/1969 | Pearce | 411/369 X |
| 3,568,746 | 3/1971 | Faroni | 411/302 |
| 3,572,414 | 3/1971 | Onufer | 411/372 |
| 3,584,531 | 6/1971 | Greenleaf | 411/369 X |
| 3,642,937 | 2/1972 | Deckert et al. | 411/258 |
| 3,711,347 | 1/1973 | Wagner et al. | 411/258 X |
| 4,093,491 | 6/1978 | Whelpton et al. | 156/293 X |
| 4,428,982 | 1/1984 | Wallace | 411/258 X |

FOREIGN PATENT DOCUMENTS

| 2063927 | 7/1972 | Fed. Rep. of Germany | 411/258 |
|---|---|---|---|
| 1296555 | 5/1962 | France | 411/369 |
| 691842 | 7/1965 | Italy | 411/369 |

Primary Examiner—Thomas J. Holko
Attorney, Agent, or Firm—Edward P. Barthel

[57] ABSTRACT

The present invention relates to improvements in a self-bonding fastener and to a novel method of curing the bonding material during assembly line fabrication of sheet metal products. The fastener includes a headed self-threading screw member having its head undersurface formed with an annular axially extending lip. An upper portion of the screw thread is precoated with a thermo-setting adhesive which, when heated, will uniformly bond the fastener to a sheet metal plate. As the fastener is threaded through an undersized hole in a sheet metal member, such as an automobile body, the adhesive reliquifies and is stripped from the screw thread. The adhesive is then re-deposited uniformly to completely fill a closed chamber defined between the head undersurface and the opposed sheet metal surface sealed on its periphery by the annular lip which defines the axial dimension of the adhesive thickness. As a final step, the adhesive may be cured as an adjunct to the assembly line travel of the vehicle body through a final paint-drying oven cycle.

1 Claim, 5 Drawing Figures

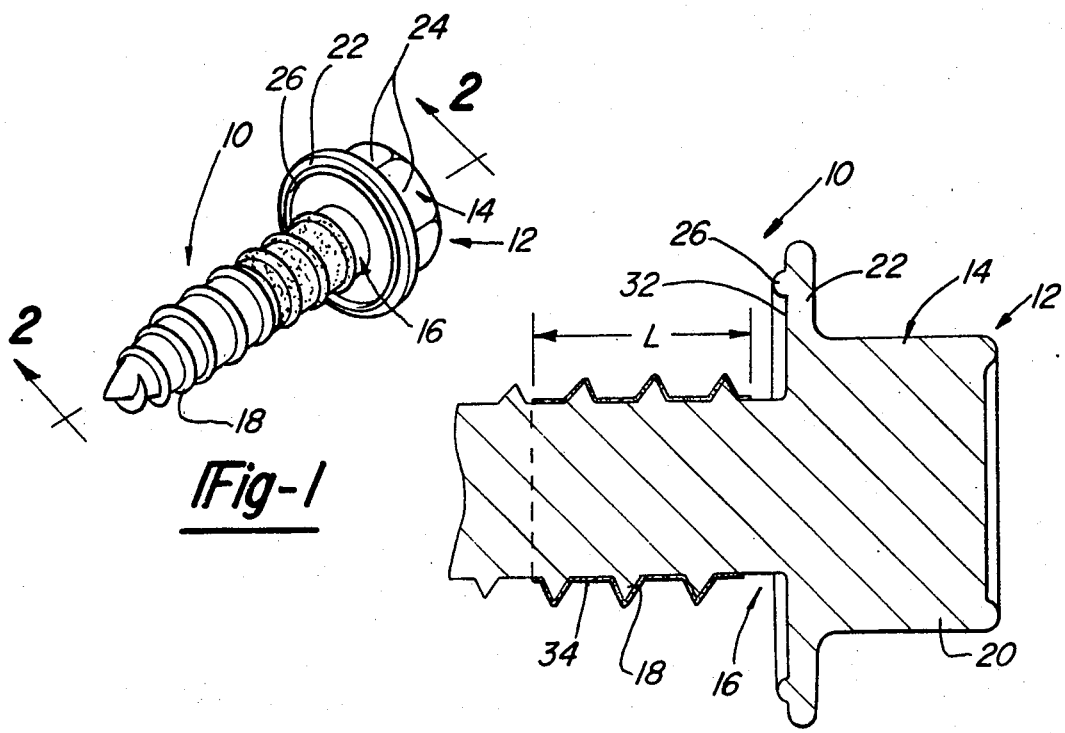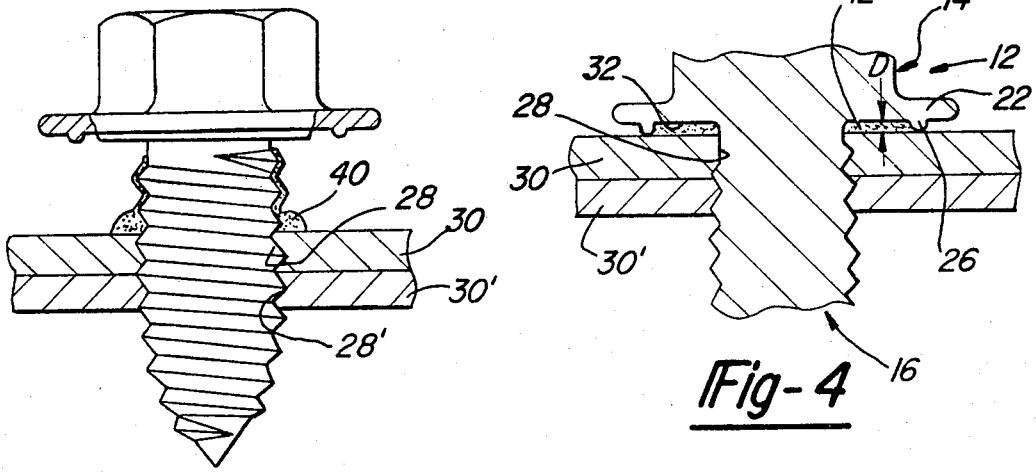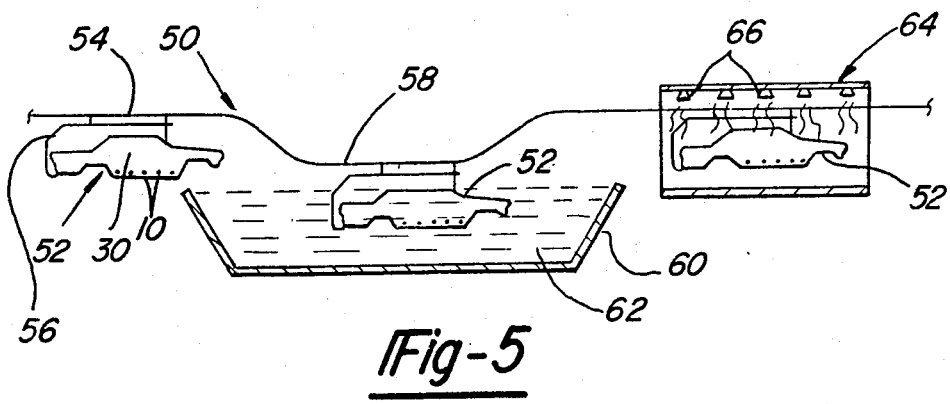

SELF-BONDING THREADED FASTENERS AND METHOD OF CURING SAME

BACKGROUND OF THE INVENTION

The present invention relates to an improved self-bonding fastener for sheet metal plates and more particularly to a self-threading metal screw having a thermosetting epoxy adhesive pre-applied to a portion of the thread so as to be solid at room temperature and upon being driven through an undersized hole in the plate is re-deposited in a sealed chamber defined intermediate the screw head and the plate for subsequent curing at an elevated temperature.

Prior art fasteners have been developed with adhesive coated thread for bonding to a workpiece. Some of these known threaded fasteners are disclosed in U.S. Pat. Nos. 2,398,838; 3,179,143; 3,642,937 and 3,783,921.

In addition to the above mentioned threaded fasteners using adhesive bonding material the U.S. Pat. No. 4,428,982 discloses a self-locking threaded fastener having material deposited in its thread grooves which is activated by engagement with a mating threaded member. The U.S. Pat. Nos. 3,678,980 and 4,093,491 teach the use of a thermoplastic adhesive attached to a body which, when heated, forms a bond between a threaded fastener and the body.

SUMMARY OF THE PRESENT INVENTION

The present invention provides a new and improved self-bonding fastener and a novel method of curing the bonding material for continuous assembly line operations such as in automobile body production. The fastener, in the preferred form, includes a hex-headed self-threading screw formed with an integral bearing flange or collar. The undersurface of the collar is formed with an annular lip portion extending axially a predetermined distance. A predetermined upper portion of the screw thread is precoated with a controlled amount of liquid thermosetting adhesive such as epoxy or synthetic resin. The adhesive which is solid at room temperature, is initially applied by brushes, rollers or the like so as to adhere to the screw thread.

During assembly, as the fastener's coated thread is rotatably driven through on undersized hole in a sheet metal member, the adhesive medium is removed from the thread upon being re-liquified. The stripped fluid adhesive is caused to flow upwardly on the convoluted rotating thread and through the hole for re-depositing on the upper surface of the sheet metal. As the fastener is tightened down the adhesive is distributed to a uniform depth between the collar undersurface and the sheet metal. The collar undersurface is thus spaced a predetermined distance above the sheet metal member defining, with the lip portion, an adhesive containing sealed chamber which when completely filled controls the thickness of the adhesive to insure a uniform bond. Thus, the controlled quantity of adhesive initially applied to a portion of the thread is substantially equal to the volume of the chamber. In practice the quantity of adhesive applied to the thread may be slightly larger than the chamber to ensure that it is completely filled.

The fastener of the present invention is particularly suited for installation during an assembly line operation wherein a sheet metal product, such as an automobile body, is being produced. As the body is continually advanced on a conveyor line various fabricating operations are preformed using the coated fasteners. At the end of the fabricating operations the threaded fasteners are subjected to a heating cycle wherein the adhesive is cured providing a positive uniform bond between the head bottom surface and the sheet metal upper surface.

An object of this invention is to simplify the installation of the bonded fasteners referred to above on a vehicle and to reduce the time required for such installation. This object is achieved in accordance with one aspect of this invention by the method of installing the mentioned fasteners on the vehicle body during an assembly line operation and thereafter at a downstream location, dipping the vehicle body in a rust coating paint primer vat or tank. This method includes a final step of thermally activating and curing the fastener adhesive material along with the paint during a continuous paint-drying cycle at the end of a vehicle body assembly line.

BRIEF DESCRIPTION OF THE DRAWINGS

The foregoing, and other objects and advantages of the present invention will become more apparent from the following detailed description when considered with the accompanying drawings, wherein:

FIG. 1 is a perspective view of one form of fastener constructed in accordance with the present invention;

FIG. 2 is an enlarged fragmentary cross-section taken along the line 2—2 of FIG. 1;

FIG. 3 is a sectional view of the fastener partially mounted within an apertured workpiece;

FIG. 4 is a fragmentary view similar to FIG. 3, showing the fastener in its final position in bonded association with the work, and FIG. 5 is a schematic view partially in section of a portion of a vehicle body assembly line wherein a primer paint applying and heat-drying cycles are shown.

DETAILED DESCRIPTION OF THE INVENTION

As best seen in FIG. 1, the self-bonding fastener or screw of the present invention is shown generally at 10 in the form of a headed metal screw 12. The screw has a hexagonal head 14 which is integrally formed with a cylindrical shank 16. An external self-tapping thread 18 is formed on the shank 16. The head 14 includes a drive or body section 20 which is coaxial with the cylindrical shank 16 and thread 18. The head 14 also includes an integral load transmitting collar 22 which is coaxial with the shank 18.

In the disclosed embodiment, the drive section 20 has six flat side faces 24 which are arranged in a hexagonal manner and are adapted to be engaged by a wrench or other tool to tighten the fastener. Although the drive section 20 has been shown as having flat side faces, it is understood that the drive section could have other constructions. Thus, the drive section could have a generally cylindrical shape and could be provided with either a slot or a socket for engagement by a tool to tighten the fastener. If desired, the drive section may have a rounded imperforate shape such as found on a carriage bolt.

The collar portion 22, as shown in FIG. 2, is formed with an annular lip 26 coaxial with the shank 18. The lip 26 has a predetermined diameter, which, in the disclosed form, is greater than the maximum diameter of the head and less than the diameter of the collar 22. The lip 26 extends axially a predetermined dimension. Thus, when the shank is fully threaded through an opening 28, shown in metal sheet 30, the underside surface 32 of the collar 22 is spaced a predetermined axial distance "D" from the upper surface of the sheet 30.

FIG. 2 shows a preferred form of the invention wherein the shank portion 16 has an upper predetermined thread portion, indicated by dimension "L", coated with a controlled amount of pre-applied epoxy composition 34. The epoxy preferrably is of a type which, when applied to the thread 18, forms a dry-to-the-touch skin for easy handling. In the present invention the epoxy is a thermo-setting single-component epoxy formula, available from ND Industries, Troy, Michigan, under the designation WS-1. It will be understood, however, that other forms of thermo-setting adhesives may be used, such as the resin base adhesives disclosed in the above mentioned U.S. Pat. Nos. 3,642,937 and 4,428,982, for example, without departing from the scope of the present invention. Applicant's invention is particularly suitable for fasteners applied on a continually advancing assembly line, such as an automobile body assembly line, for example.

As seen in FIG. 3 each fastener 10 is driven through the undersized hole 28 in one or more metal sheets 30. For example, a subjacent underlying sheet 30' with an aligned matching undersized hole 28' could be secured by the fastener to the overlying sheet 30. The threading of the fastener in the undersized hole 28 causes the solid epoxy coating 34 to re-liquify. As a result the liquid epoxy 34 is stripped from the thread 18 and temporarily re-deposits itself at 40 in FIG. 3. Upon the fastener being further rotated in a clockwise direction the collar undersurface lip 26 is brought into flush sealing contact the upper surface of the sheet 30, as seen in FIG. 4. As a result during the tightening of the fastener, the epoxy is subjected to pressure and is evenly distributed between the surfaces to a uniform depth equal to the dimension "D". It will be appreciated that the sealing contract of the lip portion 26 with the upper surface of the sheet 30 protects the epoxy against contamination from foreign matter during both its curing and service life.

A feature of the present invention involves providing a predetermined quantity of pre-applied epoxy material to the screw thread 18 to coat a given axial length "L" of the shank 16. The quantity of adhesive 34 is substantially equal to the volume of a doughnut-shaped adhesive chamber 42 formed by the fastener outer annular lip 26 and inner shank 16, the upper surface of the sheet 30 and the collar undersurface 32. As a result upon the screw 10 being tightened, the quantity of pre-coated epoxy 34 which is stripped from the thread 18 will be sufficient to completely fill the chamber 42. In actual practice, the quantity of pre-coated epoxy 34 may be slightly greater than the volume of chamber 42 to insure the complete filling of the chamber. It will be noted that the epoxy material is a thermoplastic material such that upon being heated to a predetermined temperature a solvent contained in the adhesive is evaporated and the epoxy forms a uniform bond between the fastener head bottom surface 32 and the sheet metal upper surface. The uniform depth "D" of the epoxy adhesive is designed to provide the desired shear section required to withstand the maximum holding torque of the fastener.

With reference to FIG. 5 a final portion portion of a vehicle body assembly line is generally indicated at 50. The line 50 schematically represents a corrosion-protection finishing operation where one or more coats of paint primer are, for example, applied to continuously advancing vehicle bodies 52 being suspended from an overhead conveyor track 54. The bodies, which are suspended from the track by carriers 56, have one or more fasteners 10 threaded in the body sheet metal such as the panel 30. The fasteners could also be threaded into two or more aligned undersized holes, if desired, such as the holes 28 and 28' in sheet metal members 30 and 30', respectively.

The track 54 includes a lower section 58 allowing the bodies 52 to be submerged in a vat or tank 60 filled with a suitable protective coating such as paint primer 62. The vehicle bodies 52 may be given a negative electrical charge while a positive charge is placed on the paint molecules to insure a smooth, long lasting application of the paint.

The car bodies are then continuously removed from the tank 60 and advanced to a paint heating and curing oven indicated generally at 64. A plurality of radiant heating fixtures 66 are arranged to bake the paint to a suitable temperature, in the range of 250° to 350° F., thereby bonding the paint to the metal exterior and interior surfaces.

Applicant's unique method of installing the self-bonding fasteners 10 may include a step involving a vehicle body assembly line operation. This step is made possible because the assembly line includes as a final downstream process the passage of the vehicle body through the paint heating and curing oven or furnace after the fastener has been installed in an automobile body upstream of the tank 60. Applicant's invention includes the recognition that the adhesive could be heat cured as a bonus during each vehicle body's passage through the paint drying cycle in the assembly line heating oven.

It is understood that the invention is not limited to the exact construction and method steps illustrated and described above but that various changes and modifications may be made without departing from the spirit and scope of the invention as defined in the following claims:

What is claimed is:

1. An adhesive bonding fastener having a self-tapping thread for reception in an undersized hole formed in a sheet metal member, said fastener including a head, a threaded shank defining an axis of rotation, said shank extending downwardly from said head and formed integrally therewith, and a load transmitting flange formed integrally with said head and extending radially therefrom, said flange having a flat annular bottom surface which extends perpendicular to said shank axis of rotation, said flange bottom surface formed with an annular lip of a predetermined diameter and extending a predetermined axial distance towards said shank, said lip adapted to sealingly engage the upper surface of said sheet metal such that said lip defining an annular chamber of uniform depth with said flange bottom surface and said sheet metal upper surface whereby said chamber disposed in coaxial relationship with said shank axis, said shank having a helical self-tapping thread extending from the free end of said shank to said flange bottom surface, said thread having a controlled quantity of thermo-setting adhesive comprising an epoxy and solvent composition pre-coated thereon extending a predetermined axial distance from a point adjacent said flange bottom surface towards said shank free end, said pre-coated adhesive composition having a predetermined thickness, whereby, upon said shank being threaded completely through said undersized hole, said adhesive composition liquifying so as to be stripped clearly from said self-tapping thread, said adhesive composition being transported upwardly on said thread through said undersized hole and deposited to a uniform thickness in said annular chamber between said flange bottom surface and the sheet metal upper surface, said precoated adhesive composition being of a predetermined amount sufficient to completely fill said annular chamber, and whereby upon said adhesive composition being heated to a predetermined curing temperature in the range of 250° F. to 350° F. said solvent evaporates and said epoxy provides a uniform permanent bond solely between said flange bottom surface and said sheet metal upper surface, said cured epoxy having a shear section capable of withstanding the maximum holding torque of said fastener.

* * * * *